United States Patent [19]
Welling

[11] 3,710,366
[45] Jan. 9, 1973

[54] SUPERVISING DEVICE FOR THE SUPERVISION OF A PULSE SERIES

[75] Inventor: Leo Johannes Maria Welling, Hilversum, Netherlands

[73] Assignee: U.S. Philips Corporation, New York, N.Y.

[22] Filed: Feb. 22, 1971

[21] Appl. No.: 117,505

[30] Foreign Application Priority Data

March 7, 1970 Netherlands ........................7003281

[52] U.S. Cl. ............340/248 P, 235/92 SH, 328/120, 340/213 R
[51] Int. Cl. .............................................G08b 21/00
[58] Field of Search............340/248 P, 253 P, 213 R; 235/92 SH; 328/120

[56] References Cited

UNITED STATES PATENTS

| | | | |
|---|---|---|---|
| 3,350,580 | 10/1967 | Harrison | 340/248 P X |
| 2,899,675 | 8/1959 | Clement | 340/248 P |
| 3,004,349 | 10/1961 | Ostroff | 340/248 P |
| 3,167,754 | 1/1965 | Smit et al. | 340/253 P |

Primary Examiner—David L. Trafton
Attorney—Frank R. Trifari

[57] ABSTRACT

A supervising device for the supervision of a pulse series, comprising a shift register consisting of one or more stages, provided with an input terminal for receiving the pulse series to be supervised and a clock pulse generator connected to the shift register and having a higher pulse repetition frequency than the pulse series to be supervised, for the shifting of the pulses supplied to the input terminal through the shift register and tapping device connected on one side to the shift register and on the other side to an alarm device and which, in reaction to the shifting of the pulses to be supervised supplies to the alarm device a signal alternating between two voltages levels and having a higher repetition frequency than the pulse repetition frequency of the pulse series to be supervised, said alarm device being actuated when one of the voltage levels is present longer than a given period of time.

2 Claims, 1 Drawing Figure

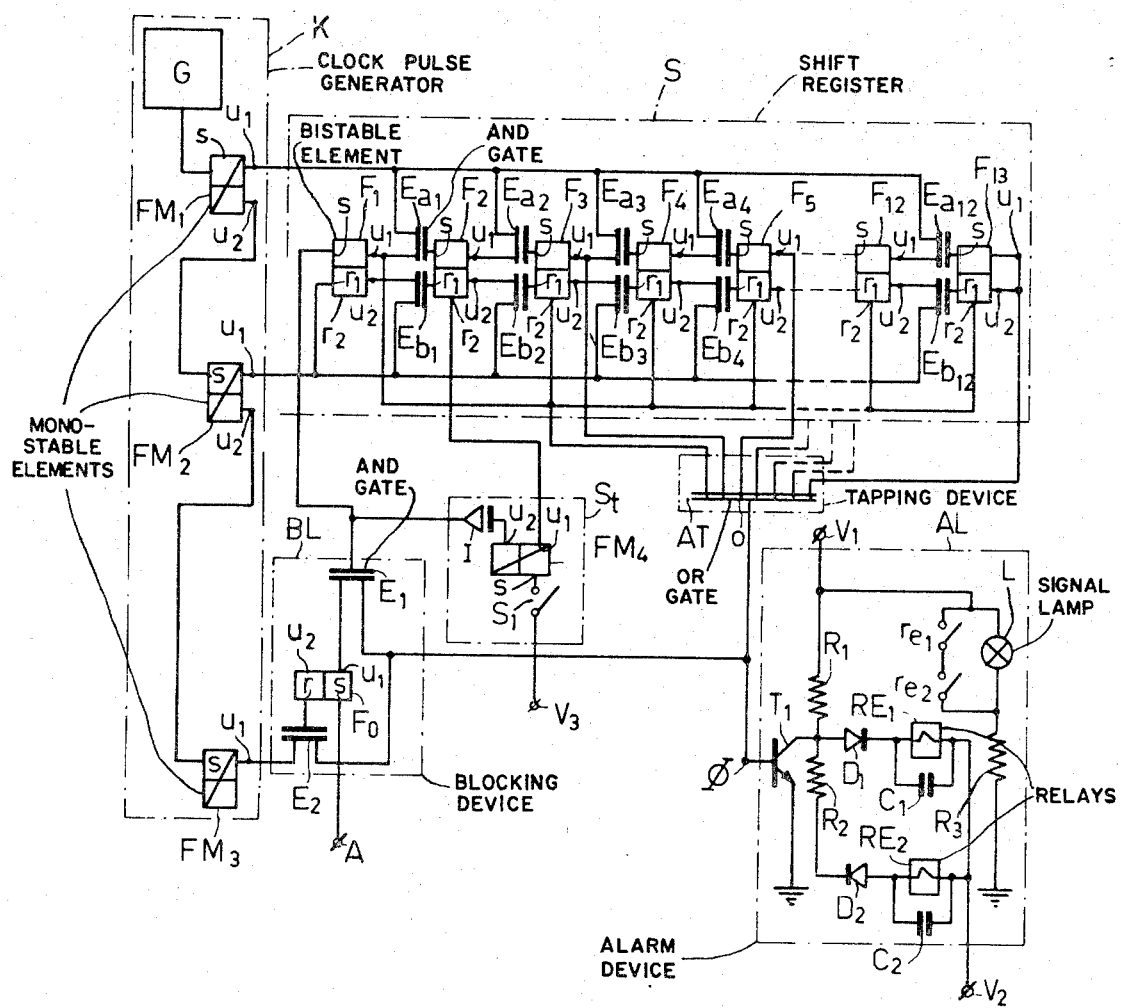

SUPERVISING DEVICE FOR THE SUPERVISION OF A PULSE SERIES

The invention relates to a supervising device for the supervision of a pulse series, comprising an alarm device which is kept out of operation by a signal derived from the pulse series to be supervised and alternating between two voltage levels, the alarm device being actuated when one of the voltage levels is present longer than a given period of time.

The alarm device of such a supervising device comprises, for example, a relay with release delay, the release time of which is adapted to the maximum admissible time that no alternations between the voltage levels occur.

An example of the application of the above mentioned supervising device is the supervision of the result (correct or wrong) of a test program performed by a processor of a telecommunication exchange which is periodically repeated and which results in a pulse on the input of the supervising device if the result is correct. The repetition period of a test program may lie in the order of magnitude of from 2 to 10 seconds. Such intervals between two successive pulses of the pulse series to be supervised cannot be bridged in practice or can be bridged only with great difficulty with the required accuracy and reliability by the release time of a relay.

The invention has for its object to provide a supervising device of the kind set forth which is suitable for the supervision of a pulse series having an arbitrarily low pulse repetition frequency.

The supervising device according to the invention is characterized in that a shift register consisting of one or more stages is provided, comprising an input terminal for receiving the pulse series to be supervised, a clock pulse generator connected to the shift register and having a higher pulse repetition frequency than the pulse series to be supervised being provided for shifting the pulses applied to the input terminal through the shift register, a tapping device being provided which is connected on the one side to the shift register and on the other side to the alarm device which, in reaction to the shifting forward of the pulses to be supervised supplies to the alarm device a signal alternating between two voltage levels and having a higher repetition frequency than the pulse repetition frequency of the pulse series to be supervised.

In order that the invention may be readily carried into effect, one embodiment thereof will be described in detail, by way of example, with reference to the accompanying diagrammatic drawing.

The supervising device comprises an input terminal A, a shift register S, a clockpulse generator K, a tapping device AT and an alarm device AL. This alarm device AL comprises two relays $RE_1$ and $RE_2$ which are released in a delayed fashion by means of capacitors $C_1$ and $C_2$, the relays being connected in parallel via diodes $D_1$ and $D_2$ and the resistor $R_2$, and which are connected via the resistor $R_1$ between the poles $V_1$ and $V_2$ of a voltage source not shown. The voltage of pole $V_1$ is twice as high with respect to earth as the voltage of pole $V_2$. To the pole $V_1$ an alarm circuit is connected comprising a signal lamp L to which the series connection of the operating contacts $re_1$ and $re_2$ of the relays $RE_1$ and $RE_2$ is connected in parallel, this circuit being connected to earth via a resistor $R_3$. For the control of the relays a transistor $I_1$ is provided, the base of which forms the input terminal Q of the alarm device AL.

If the voltage on the input terminal Q is low (approximately earth potential), transistor $T_1$ is blocked and a current flows from pole $V_1$ via resistor $R_1$, diode $D_1$ and the parallel connection of the capacitor $C_1$ with the winding of relay $RE_1$ to the pole $V_2$. This current energizes relay $RE_1$ which closes the operating contact $re_1$ and charges the capacitor $C_1$. If the voltage on the input terminal Q becomes high, transistor $T_1$ becomes conducting and the voltage of the collector of this transistor becomes almost equal to earth potential. A current then flows from pole $V_2$ via the parallel connection of capacitor $C_2$ with the winding of relay $RE_2$, diode $D_2$, resistor $R_2$ and the collector-emitter junction of transistor $T_1$ to earth. This current will charge capacitor $C_2$ and energize relay $RE_2$ so that the operating contact $re_2$ is closed and the signal lamp is short-circuited. Due to the discharge current of capacitor $C_1$, relay $RE_1$ remains energized for a given release time. By alternating the voltage on the signal terminal Q within the release times of the relays $RE_1$ and $RE_2$, these relays remain energized and the alarm circuit remains interrupted. If one of the voltage levels on the input terminal Q prevails beyond the release times of the relays, one of the relays will be released and the operating contact of this relay will be opened. A current will then flow from pole $V_1$ via the signal lamp L and the resistor $R_3$ to earth, which current causes the signal lamp L to light up. The minimum pulse repetition frequency of the voltage to be applied to the input terminal Q and alternating between two voltage levels, is limited by the discharge times of the capacitors across the windings of the relays. These discharge times amount to approximately 0.8 second. The pulse repetition time of the pulse series to be supervised, however, lies in the order of magnitude of from 2 to 10 seconds. Increasing the discharge times with the required reliability and accuracy is impossible or very difficult in practice.

According to the invention a shift register S consisting of one or more stages is provided, comprising an input terminal A for the reception of the pulse series to be supervised, a clock pulse generator K which is connected to the shift register S and has a higher pulse repetition frequency than the pulse series to be supervised being provided for shifting the pulses applied to the input terminal A through the shift register S. Furthermore, a tapping device At is provided which is connected on the one side to the shift register S and on the other side to the alarm device AL and which, in reaction to the shifting forward of the pulses to be supervised, applies a signal having a higher repetition frequency than the pulse repetition frequency of the pulse series to be supervised and alternating between two voltage levels, to the alarm device AL.

The shift register S comprises, in accordance with the required number of voltage alternations to be produced after reception of a pulse of the pulse series to be supervised, a number of stages formed by bistable elements F, said number amounting, for example, to 13, of which the elements $F_1$ to $F_5$ and the elements $F_{12}$ and $F_{14}$ are shown. Each bistable element F has a setting input $s$, a pair of resetting inputs $r_1$ and $r_2$ and a pair of output terminals $U_1$ and $U_2$. A voltage variation from low to high, called positive edge, on a setting input $s$ sets, only if the voltages on the resetting inputs $r_1$ and $r_2$ are low, a bistable element in a position which is denoted by "1" and which is characterized in that the output voltage of terminal $U_1$ is high.

A positive edge on the resetting input $r_1$ or $r_2$ sets, only if the voltage on the setting input $s$ is low, a bistable element F in a position which is denoted by "0" and which is characterized in that the output voltage of terminal $U_2$ is high.

The output terminals $U_1$ of the elements $F_1$ to $F_{12}$ are connected via AND-gates $Ea_1$ to $Ea_{12}$ to the setting inputs $s$ of the elements $F_2$ to $F_{13}$. Analogously, the output terminals $U_2$ of the elements $F_1$ to $F_{12}$ are connected via AND-gates $Eb_1$ to $Eb_{12}$ to the resetting inputs $r_1$ of the elements $F_2$ to $F_{13}$. In order to control the shift register S, a clock pulse generator, represented by the circuit of block K, is provided. This generator comprises a clock pulse source G to which three cascade-connected monostable elements $FM_1$, $Fm_2$ and $FM_3$ are connected. When a clock pulse is supplied by the source G, the elements $FM_1$, $FM_2$ and $FM_3$ successively supply pulses which are denoted by $a$, $b$ and "resetting pulse" respectively. The pulses $a$ are applied to the AND-gates $Ea_1$ to $Ea_{12}$ and the pulses $b$ are applied to the AND-gates $Eb_1$ to $Eb_{12}$ and to the resetting input $r_1$ of element $F_1$. The AND-gates $Eaa_1$ to $Ea_{12}$ and $Eb_1$ to $Eb_{12}$ are so constructed that the output voltage becomes high only if the input which is connected to an output $U_1$ of a bistable element F has a high voltage and a positive edge is received on the other input. A pulse of the pulse series to be supervised, said pulses having a positive leading edge, which is applied to input terminal A is applied to the setting input $s$ of the bistable element $F_1$ via a blocking device BL yet to be described. As a result, element $F_1$ is set to the position "7 " and, via the output $U_1$ of this element and the resetting inputs $r_2$ of the elements $F_3$ to $F_{13}$, the latter elements are set to the position "0." After the pulse applied to the input terminal A has disappeared, the voltage on the setting input $s$ of element $F_1$ becomes low. The situation in which only element $F_1$ is in position "1" and the voltage on the setting input $s$ of element $F_1$ is low, is called the "starting position." The first pulse $a$ after the occurrence of the "starting position" sets, via AND-gate $Ea_1$, which is actuated by element $F_1$, the element $F_2$ to position "1." The first pulse $b$ resets element $F_1$ to position "0." The second pulse $a$ after the occurrence of the starting position sets, via AND-gate $Ea_2$ which is actuated by element $F_2$, element $F_3$ to position "1" and the second pulse $b$ resets, via AND-gate $Eb_1$ which is actuated by element $F_1$, element $F_2$ to the position "0." One pair of shifting $a$ and $b$ produces a shift of the position "1" through one stage. This is repeated upon every subsequent clock pulse.

In order to be able to derive a signal alternating between two voltage levels from the shift register S, a tapping device AT is provided which comprises an OR-gate 0. The input terminals of this OR-gate 0 are connected to the output terminals $U_1$ of the odd elements $F_1, F_3 \ldots F_{13}$.

During the shifting of the position "1" through the shift register under the control of the clock pulses, the voltage on one or none of the input terminals of the OR-gate 0 is alternately high so that the output of this OR-gate alternately supplies a high and a low voltage, the repetition frequency being equal to the clock pulse repetition frequency. The number of alternations of the output voltage following a pulse to be supervised and received on the terminal A, is equal to the number of stages of the shift register. Every time a pulse of the pulse series to be supervised is received on terminal A within a time equal to the product of the clock pulse repetition time and the number of stages of the shift register after the previously received pulse of the pulse series to be supervised, the element $F_1$ is set to the position "1" and the shifting of the "1" through the shift register by the clock pulse is repeated. In the shift register shown in this embodiment having 13 stages, the clock pulse repetition time is 0.8 second, so that the maximum permissible repetition time of the pulses to be supervised is 10.4 seconds.

If a pulse of the pulse series to be supervised stays away longer, the clock pulse generator K will supply a pulse $a$ after the position "1" has advanced to element $F_{13}$, which will not set another element F to the position "1" and the pulse $b$ will set the element $F_{13}$ to the position "0." All input voltages of the OR-gates 0 are then low so that the output voltage of this OR-gate is low. After the discharge time of capacitor $C_2$ across the winding of relay $RE_2$ said relay is released so that the alarm circuit is actuated and the signal lamp L lights up. In order to ensure that the signal lamp remains lit when a next pulse of the pulse series to be supervised is received on input terminal A, the blocking device BL is incorporated in the alarm device. This blocking device comprises an AND-gate $E_1$, a memory element constructed as a bistable element $F_0$ and an erase circuit for the memory element $F_o$, constructed as an AND-gate $E_2$.

The operation of this blocking device BL, which controls the supply of the pulses received on terminal A to the shift register, is further described in accordance with the presence or absence of the position "1" in an even and/or odd stage of the shift register at the instant of reception of the pulse on terminal A.

If one of the even elements $F_2, F_4 \ldots F_{12}$ of the shift register is in the position "1" at the instant of reception of a pulse on terminal A, the output voltage of the OR-gate O is low. The pulse received on terminal A then sets the bistable element $F_o$ to the position "1." Via the output terminal $U_1$ a high voltage is applied to an input of the AND-gate $E_1$. Due to the low voltage on the other input terminal coming from the OR-gate 0, this AND-gate supplies low voltage. The first pulse $a$ supplied by clock pulse generator K after reception of the pulse on terminal A, will set the odd element $F_3, F_5 \ldots F_{13}$ following the even elements $F_2, F_4 \ldots F_{12}$ which is in the position "1," to the position "1." As a result of this, the output voltage of the OR-gate 0 becomes high. This voltage variation from low to high is applied, via the AND-gate $E_1$ the voltage of which on the other input terminal is high, to the setting input $s$ of element $F_1$. This element $F_1$ is then set to position "1" and sets in its turn the elements $F_3$ to $F_{13}$ to the position "0" via their resetting inputs $r_2$. The output voltage of the OR-gate remains high, however, due to the position "1" of element $F_1$. Pulse $b$ has no effect because the input voltage on the setting input $s$ of element $F_1$ is still high. Subsequently, the mono-stable element $FM_3$ of the clock pulse generator K supplies a "resetting pulse" to an input of the AND-gate $E_2$, the voltage on the other input terminal of which is high. As a result of this, the bistable element $F_o$ is set to the position "0" and a low voltage is supplied to the setting input $s$ of element $F_1$. The counting device is then in the "starting position." The further pulse pairs $a$ and $b$, supplied by the clock pulse generator K, shift the position "1" through the shift register as described above.

If one of the odd stages of the shift register is in the position "1" at the instant that a pulse is received on terminal A, the output voltage of the OR-gate 0 is high. The pulse received on terminal A sets the bistable element $F_o$ to the position "1." The variation of the output voltage of the output $U_1$ of this element is applied, via AND-gate $E_1$ both input voltages of which are high, directly to the setting input s of element $F_1$, so that this element assumes the position "1." This element $F_1$ sets the elements $F_3$ to $F_{13}$ to position "0" and supplies a high voltage to the OR-gate 0 so that the output voltage of this OR-gate remains high. The first pulse $a$ occurring after reception of a pulse on terminal A will set element $F_2$ to the position "1" via the AND-gate $Ea_1$. The first pulse $b$ has no effect since the voltage on the setting input $s$ of element $F_1$ is high. The "resetting pulse" supplied by the monostable element $FM_3$ sets element $F_o$ to the position "0" via the AND-gate $E_2$, both input voltages of which are high, so that the voltage on the setting input $s$ of element $F_1$ becomes low. The second pulse $a$ after reception of a pulse on terminal A has no effect since element $F_2$ is already in the position "1" and a high voltage, coming from element $F_1$, is still applied to the resetting input $r_2$ of element $F_3$, said element $F_3$ therefore being blocked. The second pulse "b" resets element $F_1$ to the position "0." Under the control of every subsequent pulse pair $a$ and $b$ the position "1" will be shifted through the shift register as described above. The high output voltage of the OR-gate can be maintained during two clock pulse repetition times when a pulse of the pulse series to be supervised is applied to the shift register while the position "1" is present in an odd stage. The discharge time of capacitor $C_1$ across the winding of relay $RE_1$, consequently, is selected twice as long as that of capacitor $C_2$ across the winding $RE_2$.

If none of the stages of the shift register is in the position "1" at the instant of reception of a pulse on terminal A, the output voltage of the OR-gate 0 will be low. This low voltage ensures that the output voltage of the AND-gate $E_1$ is low. The bistable element $F_o$ is set to the position "1" upon reception of a pulse on terminal A. However, since every pulse pair $a$ and $b$ shifts only the "0" position through the shift register, the output voltage of the OR-gate 0 does not become high and the AND-gate $E_1$ continues to supply a low output voltage so that in the element $F_1$ always a position "0" is written. The relay $RE_2$ is released after one clock pulse period and opens the rest contact $re_2$ of the alarm circuit so that the signal lamp L lights up and remains lit.

The alarm device also causes the signal lamp to light up after the failure of one or two clock pulses, depending on whether the position "1" is present in an even or an odd stage at the instant failure of the clock pulse, since then a constant voltage is supplied to the alarm device during two or three clock pulse periods so that one of the relays will be released. At the same time a direct voltage is supplied to the alarm device if a fault occurs no matter where in the circuit of the alarm device. A fault in the alarm device AL will also cause one of the relays to be released. The supervising device according to the invention is therefore fail-safe.

In order that the supervising device may be put back into service again after the occurrence of an alarm signal, a starting device St is provided. This starting device St comprises a monostable element $FM_4$, an inverter I and a switching contact $S_1$. This switching contact $S_1$ is connected between the setting input $s$ of element $FM_4$ and a pole $V_3$ of the voltage source, said pole having a high voltage. The output $U_1$ of element $FM_4$ is connected to the resetting input $r_2$ of element $F_2$ of the shift register and the output $U_2$ of element $FM_4$ is connected via an inverter I to the setting input $s$ of element $F_1$.

If the switching contact $S_1$ is closed, the element $FM_4$ is set to the position "1." As a result of this, on the one hand this element is set to the position "1" via inverter I and the setting input $s$ of element $F_1$ so that the output voltage of the OR-gate 0 becomes high and the elements $F_3$ to $F_{13}$ are set to the position "0," while on the other hand the latter element is set to the position "0" via a resetting input $r_2$ of element $F_2$. After element $FM_4$ has returned to the "0" position and $F_o$ is in the position "0," the shift register is in the "starting position." If the alarm signal is caused because only the relay $RE_2$ has been released, this relay will be energized by the high output voltage of the OR-gate 0 in the manner described above and the alarm signal will be removed. If the alarm signal is caused because in addition or exclusively relay $RE_1$ had been released, the first pulse pair $a$ and $b$, supplied by the clock pulse generator K, after the shift register has reached the "starting position," will cause a low output voltage on the output terminal of the OR-gate 0 in the manner described above, so that relay $RE_1$ is energized and the alarm signal is removed.

What is claimed is:

1. A supervising device for the supervision of a pulse series, comprising an alarm device which is kept out of operation in response to an alternating voltage signal having a predetermined pulse width, the alarm device being actuated in response to a pulse width in the alternating voltage signal exceeding said predetermined pulse width, a multistage shift register, an input terminal for receiving the pulse series to be supervised, a clock pulse generator means connected to the shift register and having a higher pulse repetition frequency than the pulse series to be supervised for shifting the pulses applied to the input terminal through the shift register, a tapping device connected on one side to the shift register and on the other side to the alarm device for supplying to the alarm device the alternating voltage signal having a higher repetition frequency than the pulse repetition frequency of the pulse series to be supervised, and having a pulse width larger than the predetermined pulse width in response to shift register output signals indicating that a pulse of the supervised pulse series exceeds a predetermined duration.

2. A supervising device as claimed in claim 1, characterized in that the pulse series to be supervised is supplied via a blocking device to the input terminal of the shift register, said blocking device comprising a storage element for the temporary storage of the pulses to be supervised and an AND-gate, one input of which is connected to the storage element, another input of which is connected to the tapping device, the output being connected to the input terminal of the shift register for supplying the pulse stored in the storage element to the shift register at one of the voltage levels supplied by the tapping device, and for blocking the supply of the pulse stored in the storage element to the shift register at the other voltage level supplied by the tapping device.

* * * * *